UNITED STATES PATENT OFFICE.

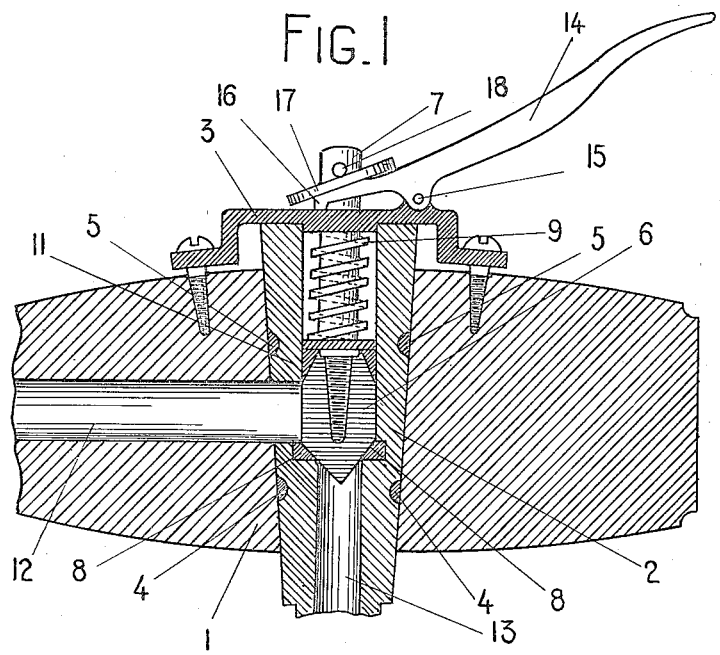
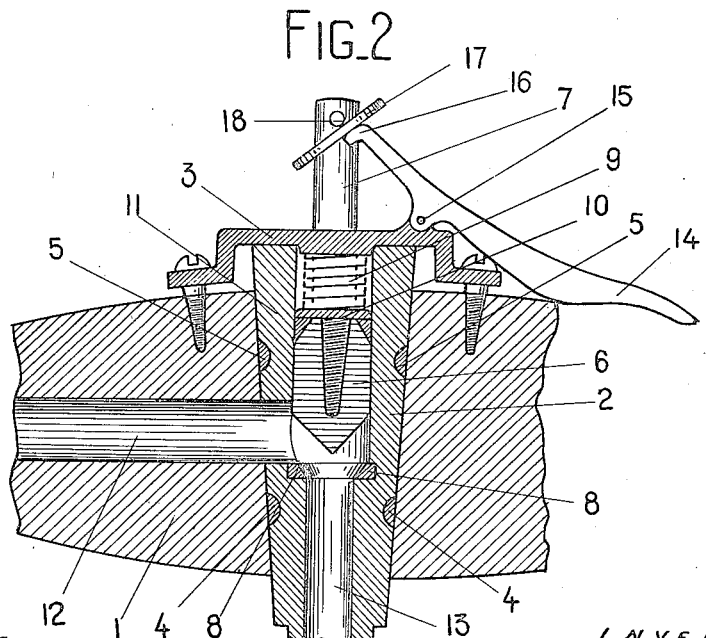

EVASIO LUIGI LIBERO, OF TURIN, ITALY.

TAP.

1,151,697.

Specification of Letters Patent.    Patented Aug. 31, 1915.

Application filed May 29, 1914.   Serial No. 841,693.

*To all whom it may concern:*

Be it known that I, EVASIO LUIGI LIBERO, a subject of the King of Italy, and resident of Turin, in the Province of Turin, Italy, have invented certain new and useful Improvements in Taps, of which the following is a true, full, and complete specification.

This invention consists in an improved tap for liquids, which is provided with double sealing portions, is easily taken apart and consequently easily cleaned.

The accompanying drawing shows the improved tap in the open and closed positions. The tap may however have very different exterior shapes according to the use to which the tap is to be put.

Figure 1 is a cross section of a tap with the passage for the liquid closed and Fig. 2 a cross section with the passage shown open.

The tap consists of a body member 1 similar to that of known taps; the body has a longitudinal bore extending to a conical cross bore in which is fitted another member or plug 2 in which is a valve 6 for controlling the passage way for the liquid. The plug 2, which may be made in two parts to facilitate cleaning is held firmly in the part 1 by means of a cross bar 3 or similar holding device fixed in suitable manner to the body 1.

The hermetic seal between the two parts is effected by suitable packing rings 4 and 5. The valve 6 is slidably mounted in the plug 2, the stem 7 of the valve projecting through the cross bar 3. This valve 6 is normally held down on its seat by a helical spring 9 inserted between the cross bar 3 and a bearing disk 10, which also serves to retain in place the packing 11 of the valve 6. If the valve is in the position shown in Fig. 1, the tap is closed and the passage through the channels 12, 13 is closed. In order to allow the liquid to flow the valve 6 must be lifted. For this purpose a lever 14 is pivoted by a pin 15 to the cross bar 3, and is provided with a forked and flat ended arm 16 which embraces the valve stem 7. A plate 17 is loosely mounted on the stem 7 so that it is free to oscillate but cannot slip off as it bears against a pin 18. If the outer arm of the lever 14 is pressed down its arm 16 by sliding under the plate 17, lifts the stem 7 and with it the valve 6, whereby the tap is opened. By further pressure on the outer arm of the lever 14 the arm 16 passes by the pin 18 and the flat end of the arm 16 by pressing against the disk keeps the valve 6 raised and the tap open. To close the tap, the outer arm of the lever is raised until the spring 9 can act on the valve 6 and press it back on to its seat 8.

What I claim is:

A tap comprising a body member having an outlet and a bore intersecting said outlet, a valve in said bore, a spring adapted to normally maintain the valve in closed position, a stem carrying the valve, a pin through said stem, a plate loosely mounted upon the stem below said pin, a lever pivotally mounted upon the body member and adapted to raise the valve by means of the pin and the intervening plate and to maintain the valve in open position through the tipping of the plate, said lever in the open position of the valve being so disposed that its fulcrum, its inner extremity and the pin on the stem fall in the same straight line.

In witness whereof, I have hereunto signed my name in the presence of two subscribing witnesses.

EVASIO LUIGI LIBERO.

Witnesses:
 PEDER BOGETTI.
 C. L. FYLES.